US011296986B2

(12) United States Patent
Malipedy (10) Patent No.: US 11,296,986 B2
(45) Date of Patent: Apr. 5, 2022

(54) AUTOMATICALLY ENABLING CREDIT-LOSS PROTOCOLS

(71) Applicant: Cisco Technology, Inc., San Jose, CA (US)

(72) Inventor: Vijaya Kumar Malipedy, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/901,653

(22) Filed: Jun. 15, 2020

(65) Prior Publication Data

US 2021/0392078 A1    Dec. 16, 2021

(51) Int. Cl.
| | |
|---|---|
| *H04L 12/801* | (2013.01) |
| *H04L 47/10* | (2022.01) |
| *H04L 69/16* | (2022.01) |
| *H04L 1/00* | (2006.01) |
| *H04L 1/18* | (2006.01) |

(52) U.S. Cl.
CPC .............. *H04L 47/10* (2013.01); *H04L 1/004* (2013.01); *H04L 1/188* (2013.01); *H04L 1/1809* (2013.01); *H04L 69/16* (2013.01)

(58) Field of Classification Search
CPC ..... H04L 1/1809; H04L 47/10; H04L 47/767; H04L 65/604; H04L 67/42; H04L 67/148; H04L 69/16
USPC ......... 370/231, 235, 252; 709/203, 223, 232
See application file for complete search history.

(56) References Cited

U.S. PATENT DOCUMENTS

| | | | | |
|---|---|---|---|---|
| 7,493,383 B1* | 2/2009 | Mukerji | ............. | H04L 47/10 709/223 |
| 2011/0131326 A1* | 6/2011 | Medard | ............. | H04L 67/14 709/225 |
| 2011/0176420 A1* | 7/2011 | Shiotsuki | ............. | H04L 69/16 370/235 |
| 2013/0007223 A1* | 1/2013 | Luby | ............. | H04L 65/604 709/219 |
| 2014/0095592 A1* | 4/2014 | Hartrick | ............. | H04L 47/767 709/203 |

\* cited by examiner

*Primary Examiner* — Harun Chowdhury
(74) *Attorney, Agent, or Firm* — Lee & Hayes, P.C.

(57) ABSTRACT

In one embodiment, a first networking device sends, to a second networking device, a training frame of a transmitter training signal (TTS) that includes a request for the second networking device to enable a protocol on the second networking device. In addition, the first networking device receives, from the second networking device, an indication that the second networking device has enabled the protocol on the second networking device. The first networking device may also send, using the protocol, first flow-control information indicating a number of data packets sent by the first networking device to the second networking device and a number of acknowledgments received from the second networking device, in addition to receiving second flow-control information indicating a number of data packets received at the second networking device from the first networking device and a number of acknowledgments sent by the second networking device to the first networking device.

20 Claims, 7 Drawing Sheets

FIG. 5

AUTOMATICALLY ENABLING CREDIT-LOSS PROTOCOLS

TECHNICAL FIELD

The present disclosure relates generally to techniques enabling a credit-recovery protocol in networking devices a fabric without requiring command-line-interface (CLI) commands at each networking device in the fabric.

BACKGROUND

In today's digital world, more and more service providers manage and provide computing resources to users to fulfill needs of the users without the users having to invest in and maintain their own computing infrastructure. For example, cloud computing often involves the use of networks of data centers which house servers, routers, and other devices that provide computing resources to users such as compute resources, networking resources, storage resources, database resources, application resources, and so forth.

Within such architectures, communications between computing devices are often routed through an array of switches, routers, and other computer networking devices. In some instances, these networking devices send data packets that originate from a source to other networking devices that are nearer to a target computing device. For example, a first switch may send data packets to a second switch, which may send along the packets to a third switch and so forth, until the packets reach the target computing device. Within this fabric of networking devices, each networking device may utilize one or more mechanisms for identifying disruption in the traffic of these packets or acknowledgment of receipt of these packets. Upon identifying such disruption, the networking devices may also be configured to recover any traffic loss. However, in some instances these mechanisms are manually configured on individual switches, or individual ports of switches, via command-line-interface (CLI) commands. This manual configuration can be both tedious and burdensome in a large fabric of networking devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes, in part, a first networking device comprising one or more processors and one or more computer-readable media storing computer-executable instructions executable by the one or more processors. Upon execution, these instructions may cause the one or more processors to performs acts comprising sending, from the first networking device to a second networking device, at least one training frame of a transmitter training signal (TTS) that includes a request for the second networking device to enable a protocol on the second networking device, as well as receiving, from the second networking device, an indication that the second networking device has enabled the protocol on the second networking device. In addition, the instructions may cause the one or more processors to perform acts comprising sending, to the second networking device and using the protocol, first flow-control information indicating a number of data packets sent by the first networking device to the second networking device and a number of acknowledgments received from the second networking device, and receiving, from the second networking device and via the protocol, second flow-control information indicating a number of data packets received at the second networking device from the first networking device and a number of acknowledgments sent by the second networking device to the first networking device.

Additionally, the techniques described herein may be performed via methods, devices, and/or non-transitory computer-readable media storing computer-executable instructions that, when executed by one or more processors, performs methods described herein.

Example Embodiments

Typical data-center architectures include interconnected computer networking devices (e.g., switches, routers, etc.) configured to route immense amounts of traffic to other devices in the architecture. For example, data originating at a source device may pass through a fabric of networking devices before reaching a target device, such as a server on which the data is to be stored. Further, in some instances the networking fabric may comprise multiple fabrics, such as a fabric of networking devices provided and maintained by an enterprise and a fabric of networking devices provided and maintained by a customer of the enterprise.

In some instances, the networking devices may be configured to implement one or more flow-control mechanisms for minimizing traffic loss within the fabric between the source device and the target device. In some instances, each networking device utilizes a credit system to ensure that buffers on a peer, downstream networking device are not overwhelmed, which would result in traffic loss. For example, envision that a port of a first, upstream networking device couples to a port of a second, downstream networking device. In this example, the second networking device may provide, to the first networking device, an indication of a number of buffers being used by the second networking device. For example, envision that the second networking device utilizes 64 buffers. In response to receiving this indication, the first networking device may initialize a counter and set a value of this counter to the buffer value, such as 64. Thereafter, the first networking device may begin sending data packets to the second networking device and, after sending each data packet, may decrement the counter. For example, upon sending a first data packet to the second networking device, the first networking device may decrement the counter from 64 to 63, upon sending a second data packet to the second networking device, may decrement the counter from 63 to 62, and so forth.

By keeping this counter, the first networking device effectively knows the amount of buffers still available at the second networking device and, thus, whether the first networking device can continue to send data packets to the second networking device. As will be appreciated, if the counter reaches zero (0), then the second networking device would not be able to store any received data packets and, thus, the first networking device may at least temporarily refrain from sending further packets.

In addition, however, the second networking device may send the received data packets further downstream toward the target device. For example, after receiving the first data packet from the first networking device, the second networking device may send this packet to its peer networking device—such as a third networking device that connects directly to a port of the second networking device. Upon sending this data packet to the third networking device, the second networking device may send, to the first networking device, an acknowledgment that it has received and sent along the data packet. For example, after sending the data packet to the third networking device, the second networking device may send a "receiver ready" signal, also known as an R_RDY primitive, to the first networking device.

In response to the receiving this R_RDY primitive, the first networking device may increment its counter. For example, if the counter is currently set at 62, as in the example above, then the first networking device may increment its counter to 63. Stated otherwise, given that the second networking device has sent along the data packet to the third networking device and made the buffer in which the packet was stored again available for use, and given that the first networking device successfully received a corresponding indication, the first networking device may increment the counter to indicate that another buffer is now available. By decrementing a counter in response to sending a packet and incrementing the counter upon receiving an R_RDY primitive, the first networking device is able to determine whether the second networking device has space to receive additional data packets. Furthermore, while the above example describes the first networking device maintaining a counter for the second networking device, the second networking device may maintain a corresponding counter for the third networking device, and so forth. That is, each networking device in the fabric may maintain a counter a for its peer, downstream networking device in order for each respective networking device to determine whether its peer, downstream networking device has space to receive further data packets. Thus, these peer devices within the fabric each send respective R_RDY primitives to their upstream networking device upon each respective networking device sending along a data packet and, thus, freeing up a buffer.

In some instances, however, R_RDY primitives themselves may be dropped within the fabric. For instance, in the example above, the second networking device may send an R_RDY primitive to the first networking device in response to the second networking device sending a data packet to the third networking device. However, the first networking device might not receive the R_RDY primitive due to a problem in the network. Thus, the counter on the first networking device may inaccurately represent the state of the second networking device.

In some instances, the networking devices in the fabric may implement a protocol for exchanging flow-control information to lessen the effects of R_RDY loss in the network. That is, the networking devices may implement a protocol in which the devices periodically exchange, with their networking-device peer, information regarding how many packets they have sent (or received) and how may R_RDY primitives they have received (or sent). This information may be used to identify any credit loss (e.g., R_RDY) loss within the network and, if a credit-loss state is identified, may result in one or more networking devices implementing a credit-recovery protocol.

In some instances, the networking devices in the fabric may be configured to implement a buffer-to-buffer state change (BBSC) protocol in which the networking devices exchange flow-control information with their peer networking devices. For example, at some periodicity, the first networking device may send, to the second networking device, information regarding: (i) the number of packets the first networking device has sent to the second networking device, and (ii) the number of R_RDY primitives that the first networking device has received from the second networking device. Similarly, the second networking device may send, to the first networking device, information regarding: (i) the number of packets the second networking device has received from the first networking device, and (ii) the number of R_RDY primitives that the second networking device has sent to the first networking device. In the context of the BBSC protocol, this may be known as sending buffer-to-buffer-state change-send (BBSCs) primitives (indicating the number of sent packets/R_RDYs) and buffer-to-buffer-state-change-received (BBSCr) primitives (indicating the number of received packets/R_RDYs). Thus, at the appropriate periods specified by the BBSC protocol, the first and second networking devices may send one another respective BBSCs and BBSCr primitives.

In addition, each networking device within the fabric may exchange these primitives with their neighboring peer networking devices. For example, the second networking device may send, to the third networking device, BBSCs and BBSCr primitives indicating the number of packets the second networking device has sent to the third networking device and the number of R_RDY primitives the second networking device has received from the third networking device. The third networking device may likewise send, to the second networking device, BBSCs and BBSCr primitives indicating the number of data packets the third networking device has received from the second networking device and the number of R_RDY primitives the third networking device has sent to the second networking device. A similar exchange of state information may occur between the third networking device and a fourth, downstream networking device that couples to a port of the third networking device, and so forth.

With this information, each networking device may determine whether credit loss has occurred between the networking device and its peer networking device. For example, the first networking device may compare the number of R_RDY primitives it has sent to the second networking device to the number of R_RDY primitives the second networking device has received from the first networking device. Similarly, the first networking device may compare the number of data packets it has sent to the second networking device to the number of data packets the second networking device has received from the first networking device. Similarly, the second networking device may compare this information as received at the second networking device. If the information does not match, then the networking device may identify a credit-loss state and, in response, may initiate a protocol or process for recovering any lost credits. By doing so, the networking devices may ensure that they now have an adequate understanding of their respective neighboring networking device's state (e.g., that the counters may be accurate). In the BBSC protocol, the networking device determining that it has sent or received fewer than the peer networking device may identify the credit-loss state and may initiate the credit-recovery protocol.

While the BBSC protocol is, thus, helpful to ensure that networking devices in the fabric maintain an accurate view of the state of their neighboring networking devices, and thus minimizing occurrences of link resets due to unknown R_RDY leakage in the network, the BBSC protocol has traditionally been enabled on an individual port basis on individual switches via command-line-interface (CLI) commands. For example, if a single switch in a fabric includes 64 ports, an administrator of the network would need to make 64 separate CLI commands on the switch to enable the BBSC protocol on each port. Further, if the fabric includes hundreds of switches, the administrator will similarly need to execute CLI commands on each port of this large number of switches. As will be appreciated, this creates an immense burden on the system administrator(s).

Thus, described herein are techniques for enabling a protocol, such as BBSC, on networking devices without the need for CLI commands. For example, the techniques may enable the BBSC protocol, or other protocols, using one or more training frames of a transmitter training signal (TTS). In some instances, these training frames are exchanged between peer networking device prior to creating a communication channel (e.g., a fiber channel). Thus, by including this information in the training frame(s), the BBSC protocol may be enabled through the fabric upon creation of the network and automatically, without requiring system administrators to manually enable this functionality on each port of each switch in the fabric.

In some instances, a system administrator may utilize one or more bits of a training frame to request that the networking devices in the fabric enable the protocol, such as the BBSC protocol. For example, given that training frames often have one or more "reserved" bits that are currently not used to carry information, these bits may be used to indicate these requests. For example, an administrator may configure a predefined bit in a control training frame to request that the peer networking device enable the BBSC protocol. For example, software in each networking device may be configured to analyze a predefined bit (e.g., bit 6 or any other bit) of a received control training frame to determine whether the networking device that sent the training frame has set the bit to a "1", for example, indicating a request to enable the BBSC protocol or whether the bit is set to "0", indicating that there is no such request. Further, the control training frame may be accompanied by a status training frame and may include a predefined bit indicating whether or not the networking device that is sending the training frame is capable of and/or currently enabling the BBSC protocol. For example, the predefined bit (e.g., bit 6 or any other bit) in the status training frame may be set to "1" if the networking device is capable of and/or enabling the BBSC protocol, and otherwise may be set to "0".

For example, a control training frame and a status training frame sent by the example first networking device, discussed above, may be set to "1" when these training frames are sent to the second, downstream networking device. As part of the channel-creation process, the second networking device may analyze the training frames and engage in an iterative back-and-forth session with the first networking device. During this communication, the first and second networking devices may negotiate characteristics of the to-be-created channel (e.g., fiber channel), such as the speed of the channel, whether to enable forward error correction (FEC), whether to enable BBSC, and/or the like. In some instances, the second networking device may send back an indication that is has enabled the BBSC protocol in response to identifying the predefined bit set in the control training frame. For example, the second networking device may set the bit to "1" in the status training frame that it sends back to the first networking device.

In addition, the second networking device may send, to the third, downstream networking device, a control and status training frames that also request that the third networking device enable the BBSC protocol. The second and third networking devices may engage in a similar back-and-forth session to create the channel, a part of which may include enabling the BBSC protocol and indicating, to the second networking device, that the third networking device has done so.

Thus, the techniques described herein enable networking devices within a networking fabric to enable the BBSC protocol without requiring that a system administrator manually enable this feature on each port of each switch. Instead, by embedding the request to enable the feature into one or more training frames that are distributed throughout the fabric, each port of each networking device that is part of the fabric may receive and identify the request to enable the BBSC protocol and, in turn, may enable this feature. Further, enabling the BBSC protocol enables peer networking devices in the fabric to periodically sync with regards current buffer states and, if necessary, engage in a credit-recovery process if a credit-loss state is identified.

Figure 1:
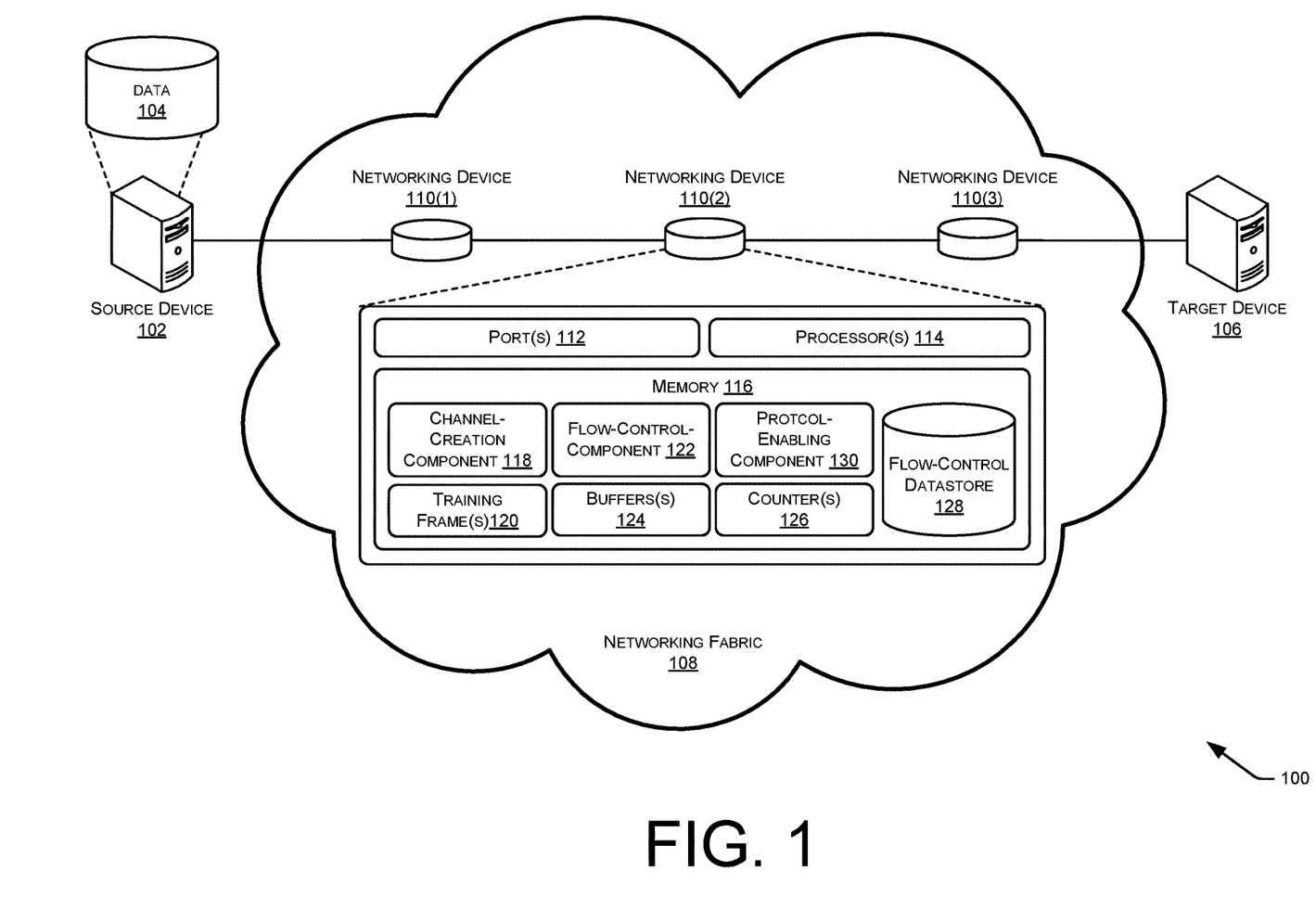
FIG. 1 illustrates a system-architecture diagram of an example environment in which a source device sends data packets to a target device via one or more networking devices of a networking fabric. Within this fabric, each networking device may be configured to implement a protocol, such as buffer-to-buffer state change notification (BBSCN) protocol in which each networking device exchanges flow-control information with its peer networking device, such as an indication of a number of packets sent and a number of acknowledgments (e.g., R_RDYs) received, or vice versa. Within the environment of FIG. 1, this protocol may be enabled using one or more training frames rather than requiring multiple commands via a command line interface (CLI).

FIG. 1 illustrates a system-architecture diagram of an example network environment 100 in which a source device sends 102 data packets 104 to a target device 106 a networking fabric 108 that includes one or more networking devices 110(1), (2), (3), ..., (N). Within this fabric 108, each networking device 110 may be configured to implement a protocol, such as buffer-to-buffer state change notification (BBSCN) protocol in which each networking device 110 exchanges flow-control information with its peer networking device 110, such as an indication of a number of packets sent and a number of acknowledgments (e.g., R_RDYs) received, or vice versa. Within the network 100, this protocol may be enabled using one or more training frames rather than requiring multiple commands via a command line interface (CLI).

As illustrated, each networking device 110, such as the networking device 110(2), may include one or more ports 112 for connecting to respective ports of other networking devices, one or more processors 116, and memory (or "computer-readable media") 116. While FIG. 1 illustrates the components as residing on the networking device 110(2), it is to be appreciated that the same or similar components may reside on the networking devices 110(1) and 110(3), as well on other networking devices throughout the fabric 108. The network 100 may comprise an array of networking devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the network 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the memory 116 of the example networking device 110(2) may store a channel-creation component 118, one or more training frames 120, a flow-control component 122, one or more buffers 124, a protocol-enabling component 126, one or more counters 126, and a flow-control datastore 128. To begin, the channel-creation component 118 may be configured to create a channel, such as a fiber communication channel, between multiple ones of the networking devices 110 in the fabric 108 to enable the source device 102 to connect to the target device 106. In some instances, the channel-creation component 118 may use one or more training frames 120 of a transmitter training signal (TTS) to set up this connection. For example, the channel-creation component 118 may set various values in the control and status training frames 120 before sending these training frames to adjacent networking devices in the fabric. These training frames may enable the networking devices 110 to negotiate certain parameters regarding the connection and, ultimately, to create the connection. For example, the training frames 120 may be used to set the speed of the connection, whether the networking devices 110 are to enable forward error correction (FEC), whether the networking devices 110 are to enable BBSC, and/or the like.

In addition, the flow-control mechanism 122 may control the flow of the data 104 through the fabric 108 to minimize the amount of traffic loss between the source device 104 and the target device 106. For example, the flow-control component 122, as well as each corresponding component on the other networking devices 110 in the fabric, may utilize a credit system to ensure that buffers on a peer, downstream networking device are not overwhelmed, which would result in traffic loss.

For example, envision that a port of the first, upstream networking device 110(1) couples to one of the ports 112 of the second, downstream networking device 110(2). In this example, the second networking device 110(2) may provide, to the first networking device 110(1), an indication of a number of buffers 124 being used by the second networking device 110(2) as part of the created communication channel for receiving and sending along the data 102. In this example, the second networking device 110(2) may indicate that it is utilizing 64 buffers. In response to receiving this indication, the flow-control component of the first networking device 110(1) may initialize a counter (similar to the illustrated counter 126 of the second networking device 110(2)) and set a value of this counter to the buffer value, such as 64.

Thereafter, as the first networking device 110(1) begin receiving data packets 104 from the source device 102 and sending these data packets 104 to the second networking device 110(2), the first networking device 110(1) may decrement the counter. For example, upon sending a first data packet to the second networking device 110(2), the first networking device 110(1) may decrement the counter from 64 to 63, upon sending a second data packet to the second networking device 110(2), may decrement the counter from 63 to 62, and so forth.

Similarly, the flow-control component 122 on the second networking device 110(2) may receive, from the third networking device 110(3) is downstream of and couples to a port of the second networking device 110(2), an indication of a number of buffers used in the communication by the third networking device 110(3). For example, envision that the third networking device 110(3) indicates that it is utilizing 128 buffers. In response to receiving this indication, the second networking device 110(2) may set the value of its counter 126 to 128. Further, as the second networking device sends data packets of the data 104 that it receives from the first networking device 110(1) to the third networking device 110(3), the second networking device 110(2) may decrement its counter 126 (e.g., from 128 to 127, and so forth).

By keeping these counters, each of the networking devices 110 effectively knows the amount of available buffers at its downstream peer networking device. For example, the counter of the first networking device 110(1) enables this first networking device to know the amount of buffers still available at the second networking device 110(2) and, thus, whether the first networking device 110(1) can continue to send data packets to the second networking device 110(2). Similarly, the counter 126 of the second networking device 110(2) enables this second networking device 110(2) to know the amount of buffers still available at the third networking device 110(3) and, thus, whether the second networking device 110(2) can continue to send data packets to the second networking device 110(3), and so forth. For example, and as will be appreciated, if the counter 126 reaches zero (0), then the third networking device 110(3) would likely not be able to store any received data packets and, thus, the second networking device 110(2) may at least temporarily refrain from sending further packets.

In addition to the above, each flow-control component 122 on the networking devices may be configured to send, to its upstream networking device, an indication of whether the respective networking device has sent along a received data packet to a downstream networking device. For example, after receiving the first data packet from the first networking device 110(1), the second networking device 110(2) may send this packet to the third networking device 110(3). Upon sending this data packet to the third networking device 110(3), the flow-control component 122 of the second networking device 110(2) may send, to the first networking device 110(1), an acknowledgment that it has received and sent along the data packet. For example, after sending the data packet to the third networking device 110(3), the flow-control component 122 of the second networking device 110(2) may send a "receiver ready" signal, also known as an R_RDY primitive, to the first networking device 110(1).

In response to the receiving this R_RDY primitive, the first networking device 110(1) may increment its counter. For example, if the counter is currently set at 62, as in the example above, then the flow-control component of the first networking device 110(1) may increment its counter to 63. Stated otherwise, given that the second networking device 110(2) has sent along the data packet to the third networking device 110(3) and made the buffer in which the packet was stored again available for use, and given that the first networking device 110(2) successfully received a corresponding indication, the first networking device 110(1) may increment its counter to indicate that another buffer is now available.

Similarly, after the third networking device 110(3) receives the packet from the second networking device 110(2) and sends it along to its downstream peer (e.g., a fourth networking device), the third networking device 110(3) may send an R_RDY primitive back to the second computing device 110(2). In response to receiving this R_RDY primitive, the flow-control component 122 of the second networking device 110(2) may increment the counter 126. For instance, continuing the example from above, the flow-control component 122 may increment the counter 126 from 127 to 128. By decrementing a counter in response to sending a packet and incrementing the counter upon receiving an R_RDY primitive, each networking device is able to determine whether its downstream peer networking device has space to receive additional data packets.

In some instances, however, R_RDY primitives themselves may be dropped within the fabric 108. For instance, in the example above, the second networking device 110(2) may send an R_RDY primitive to the first networking device 110(1) in response to the second networking device 110(2) sending a data packet to the third networking device 110(3). However, the first networking device 110(1) might not receive the R_RDY primitive due to a problem in the fabric 108. Thus, the counter on the first networking device 110(1) may inaccurately represent the state of the second networking device 110(2), such as the available number of buffers of the total number of buffers 124 of the second networking device 110(2).

In some instances, each flow-control component 122 of each respective networking device in the fabric may implement a protocol for exchanging flow-control information to lessen the effects of R_RDY loss in the network. That is, the flow-control component 122 may utilize a protocol in which the devices periodically exchange, with their networking-device peer, information stored in a respective flow-control datastore 128 regarding how many packets they have sent (or received) and how may R_RDY primitives they have received (or sent). This information may be used to identify any credit loss (e.g., R_RDY) loss within the network and, if a credit-loss state is identified, may result in one or more networking devices implementing a credit-recovery protocol.

In some instances, the flow-control component 122 of each of the networking devices in the fabric may be configured to implement a buffer-to-buffer state change (BBSC) protocol in which the networking devices exchange flow-control information with their peer networking devices. For example, at some periodicity, the first networking device 110(1) may send, to the second networking device 110(2), information regarding: (i) the number of packets the first networking device 110(1) has sent to the second networking device 110(2), and (ii) the number of R_RDY primitives that the first networking device 110(1) has received from the second networking device 110(2). Similarly, the second networking device 110(2) may send, to the first networking device 110(1), information regarding: (i) the number of packets the second networking device 110(2) has received from the first networking device 110(1), and (ii) the number of R_RDY primitives that the second networking device 110(2) has sent to the first networking device 110(1). In the context of the BBSC protocol, this may be known as sending buffer-to-buffer-state change-send (BBSCs) primitives (indicating the number of sent packets/R_RDYs) and buffer-to-buffer-state-change-received (BBSCr) primitives (indicating the number of received packets/R_RDYs). Thus, at the appropriate periods specified by the BBSC protocol, the first and second networking devices may send one another respective BBSCs and BBSCr primitives.

In addition, each networking device within the fabric may exchange these primitives with their neighboring peer networking devices. For example, the second networking device 110(2) may send, to the third networking device 110(3), BBSCs and BBSCr primitives indicating the number of packets the second networking device 110(2) has sent to the third networking device 110(3) and the number of R_RDY primitives the second networking device 110(2) has received from the third networking device 110(3). The third networking device 110(3) may likewise send, to the second networking device 110(2), BBSCs and BBS Cr primitives indicating the number of data packets the third networking device 110(3) has received from the second networking device 110(2) and the number of R_RDY primitives the third networking device 110(3) has sent to the second networking device 110(2). A similar exchange of state information may occur between the third networking device and a fourth, downstream networking device that couples to a port of the third networking device 110(3), and so forth.

With this information, the flow-control component 122 of each networking device may determine whether credit loss has occurred between the networking device and its peer networking device. For example, the flow-control component 122 of the first networking device 110(1) may compare the number of R_RDY primitives it has sent to the second networking device 110(2) to the number of R_RDY primitives the second networking device 110(2) has received from the first networking device 110(1). Similarly, the flow-control component 122 of the first networking device 110(1) may compare the number of data packets it has sent to the second networking device 110(2) to the number of data packets the second networking device 110(2) has received from the first networking device 110(1). Similarly, the flow-control component 122 of the second networking device 110(2) may compare this information as received at the second networking device 110(2). If the information does not match, then the networking device may identify a credit-loss state and, in response, may initiate a protocol or process for recovering any lost credits. By doing so, the networking devices may ensure that they now have an adequate understanding of their respective neighboring networking device's state (e.g., that the counters may be accurate). In the BBSC protocol, the networking device determining that it has sent or received fewer than the peer networking device may identify the credit-loss state and may initiate the credit-recovery protocol.

While the BBSC protocol is, thus, helpful to ensure that networking devices in the fabric maintain an accurate view of the state of their neighboring networking devices, and thus minimizing occurrences of link resets due to unknown R_RDY leakage in the network, the BBSC protocol has traditionally been enabled on an individual port basis on individual switches via command-line-interface (CLI) commands. For example, if a single switch in a fabric includes 64 ports, an administrator of the network would need to make 64 separate CLI commands on the switch to enable the BBSC protocol on each port. Further, if the fabric includes hundreds of switches, the administrator will similarly need to execute CLI commands on each port of this large number of switches. As will be appreciated, this creates an immense burden on the system administrator(s).

In this instance, however, the second networking device 110(2) is shown to include a protocol-enabling component 130, which may be configured to identify, from a received training frame, a request to automatically enable a predefined protocol, such as the BBSC protocol. For example, using the techniques described herein, an administrator or a device itself may configure a training frame to include a request to enable the BBSC protocol. For example, a control training frame sent from the first networking device 110(1) to the second networking device 110(2) may include a request that the second networking device 110(2) enable the BBSC protocol. In addition, a status training frame sent from the first networking device 110(1) to the second networking device 110(2) may include an indication that the first networking device 110(1) is capable of and/or has enabled the BBSC protocol.

Upon receiving these training frames 120 and identifying the request to enable the protocol, the protocol-enabling component 130 may enable the respective port associated with the communication channel being created by the training frames 120 to implement the BBSC protocol. In addition, the protocol-enabling component 130 may include, as part of training frames 120 sent back to the first networking device 110(1), an indication that the second networking device 110(2) is capable of and/or has enabled the BBSC protocol. Furthermore, the protocol-enabling component 130 may work with the channel-creation component 118 to set the corresponding values in the training frames sent to the third networking device 110(3). For example, one or both of these components may set a bit in the a control training frame sent to the third networking device 110(3) that indicates a request that the third networking device 110(3) enable the BBSC protocol. The third networking device 110(3) may enable this protocol and propagate this request to its downstream peer networking device via one or more training frames.

Thus, protocol-enabling component 130, in unison with the training frames described herein, enables networking devices 110 within the fabric 108 to enable the BBSC protocol without requiring that a system administrator manually enable this feature on each port of each networking device. Instead, by embedding the request to enable the feature into one or more training frames 120 that are distributed throughout the fabric, each port of each networking device 110 that is part of the fabric may receive and identify the request to enable the BBSC protocol and, in turn, may enable this feature. Further, enabling the BBSC protocol enables peer networking devices 110 in the fabric to periodically sync with regards current buffer states and, if necessary, engage in a credit-recovery process if a credit-loss state is identified. In some instances, this credit-recovery process comprises the credit-recovery process standardized by INCITS Fibre Channel standards, such as FC-FS-4, a T-11 document, clause: 20.4.9 BB_Credit Recovery.

Figure 2:
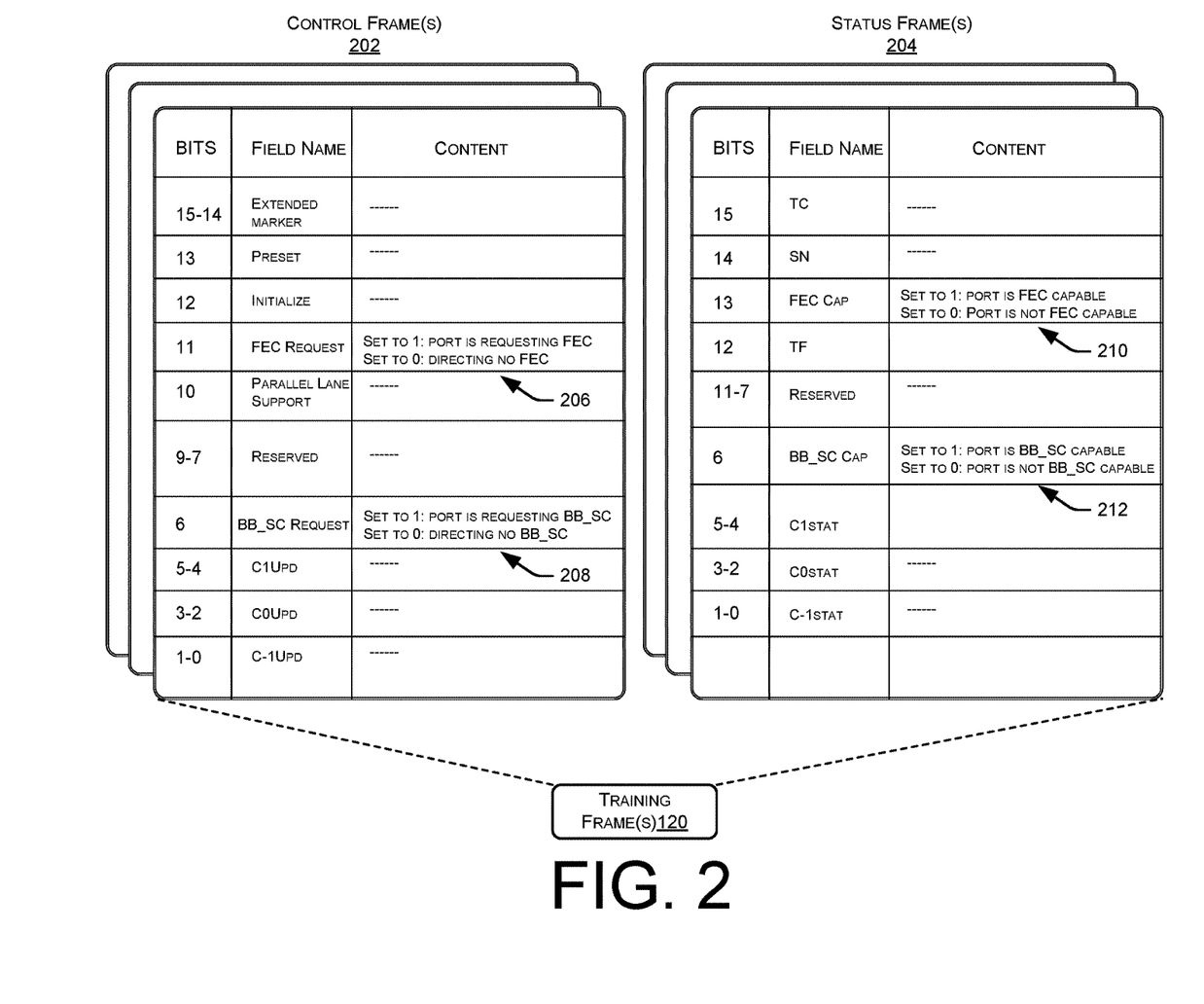
FIG. 2 illustrates an example control training frame and an example status training frame that the networking devices within the fabric may send to their peer networking devices. As illustrated, the control training frame may include a bit in which a networking device may request that another networking device in the fabric enable a protocol, such as the BBSCN protocol. In addition, the status training frame may include a bit in which the network device may indicate, to the other networking device, that the networking device itself is capable of implementing the protocol, such as the BBSCN protocol.

FIG. 2 illustrates an example control training frame 202 and an example status training frame 204 that the networking devices 110 within the fabric 108 may send to their peer networking devices 110. The control training frame 202 may represent varying requests made by the networking device that sends to the training frames to the receiving networking device, whereas the status training frame 204 may represent capabilities of the networking device sending the training frames. As illustrated, the control training frame 202 and the status training frame 204 each include multiple different bits associate with different "field names" and different "content". For brevity, the content of some of the fields of the training frames are left blank and not discussed herein. However, and as is known, some values of these training frames may be used to negotiate aspects of a connection between the networking device that sends these training frames and the networking device that receives these training frames.

FIG. 2, for instance, illustrates at 206 that a particular bit of the control frame may be associated with a request for the receiving the networking device to enable forward error correction (FEC). For example, bit 11 may have been set aside to indicate whether the networking device that sends the training frame is requesting that the receiving networking device enable FEC. For example, bit 11 of the control training frame 202 may set the bit to "1" if FEC is requested and "0" if not. In addition, at 208, the control training frame indicates that a particular bit (here, bit 6) is set aside for, and associated with, a request to enable the BBSC protocol. For example, the control training frame 202 may set bit 6 to a value of "1" if the BBSC protocol is being requested and "0" if not. In some instances, the protocol-enabling component 130 may be configured to analyze the value of bit 6 upon receiving a control training frame to determine whether or not to enable the BBSC protocol.

In addition, FIG. 2 illustrates the status training frame 204, which indicates the capabilities of the networking device that is sending the illustrated training frames. For example, the status training frame 204 includes at 210, an indication that the networking device that is sending the training frames is capable of executing FEC. That is, the status training frame 204 may associate bit 13 with an indication of whether the sending device is FEC capable. For example, the networking device may set the bit 13 to a value of "1" if the networking device is FEC capable and "0" otherwise. In addition, the status training frame 204 includes at 212, an indication that the networking device that is sending the training frames is capable of executing the BBSC protocol. That is, the status training frame 204 may associate bit 6 with an indication of whether the sending device is capable of executing the BBSC protocol. For example, the networking device may set the bit 6 to a value of "1" if the networking device is capable of implementing the BBSC protocol and "0" otherwise. In some instances, the protocol-enabling component 130 may be configured to analyze this bit value to determine whether the sending networking device is BBSC-capable and/or to set a value of this bit when generating status training frames itself.

While FIG. 2 illustrates example control and status training frames 202 and 204, it is to be appreciated that other training frames may be used for enabling the BBSC protocol in the fabric 108. For example, any other bits may be associated with signaling a request for and/or capability of the BBSC protocol.

Figure 3A:
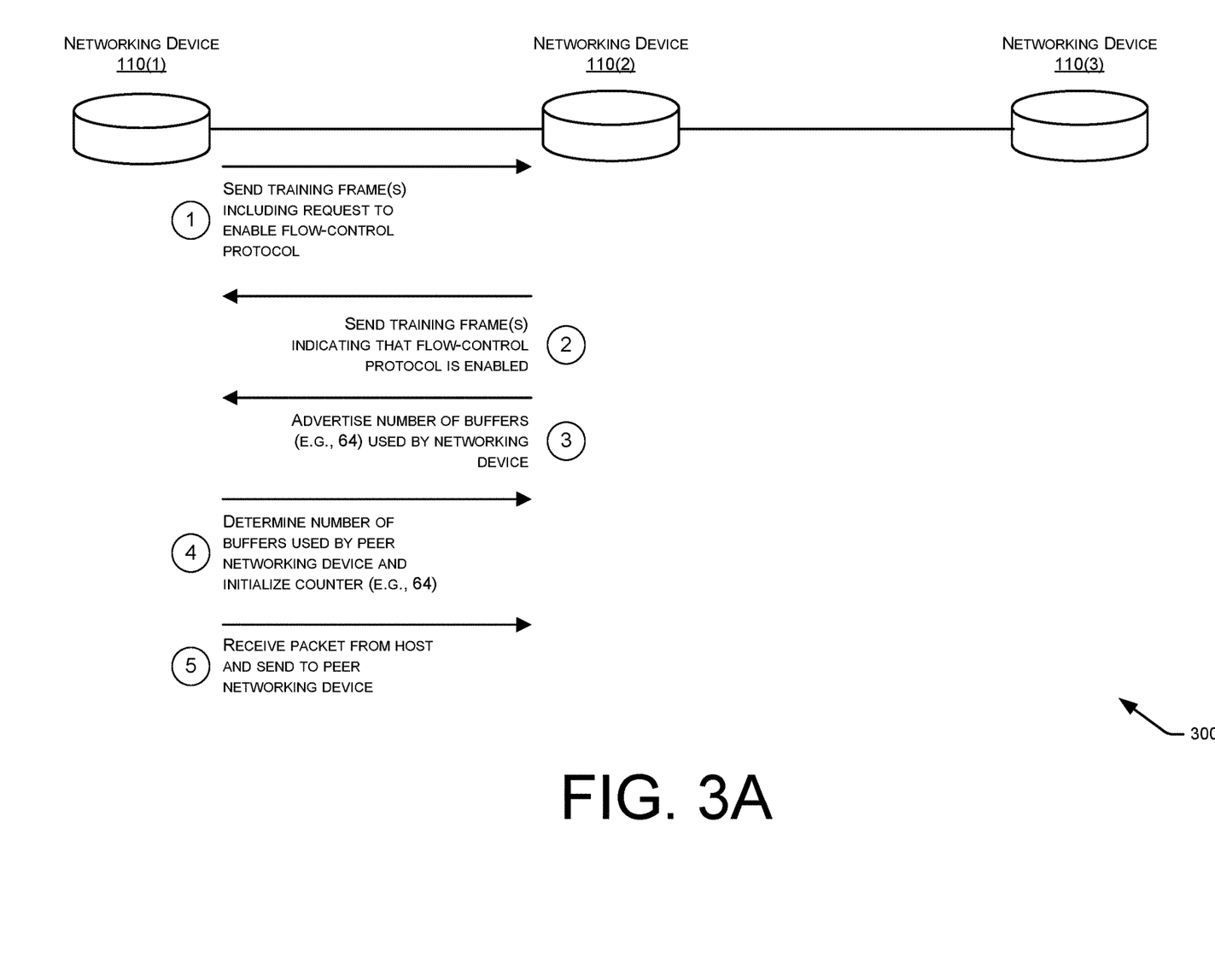
FIGS. 3A-C collectively illustrate an example sequence of operations within the fabric of FIG. 1 as it pertains to two networking devices. As illustrated, a first networking device may send, to a second networking device, one or more training frames of a transmitter training signal (TTS) requesting that a second networking device enable a protocol, such as the BBSCN protocol. In response, the second networking device may enable the protocol and, thus, the first and second networking devices may periodically exchange flow-control information.
Figure 3B:
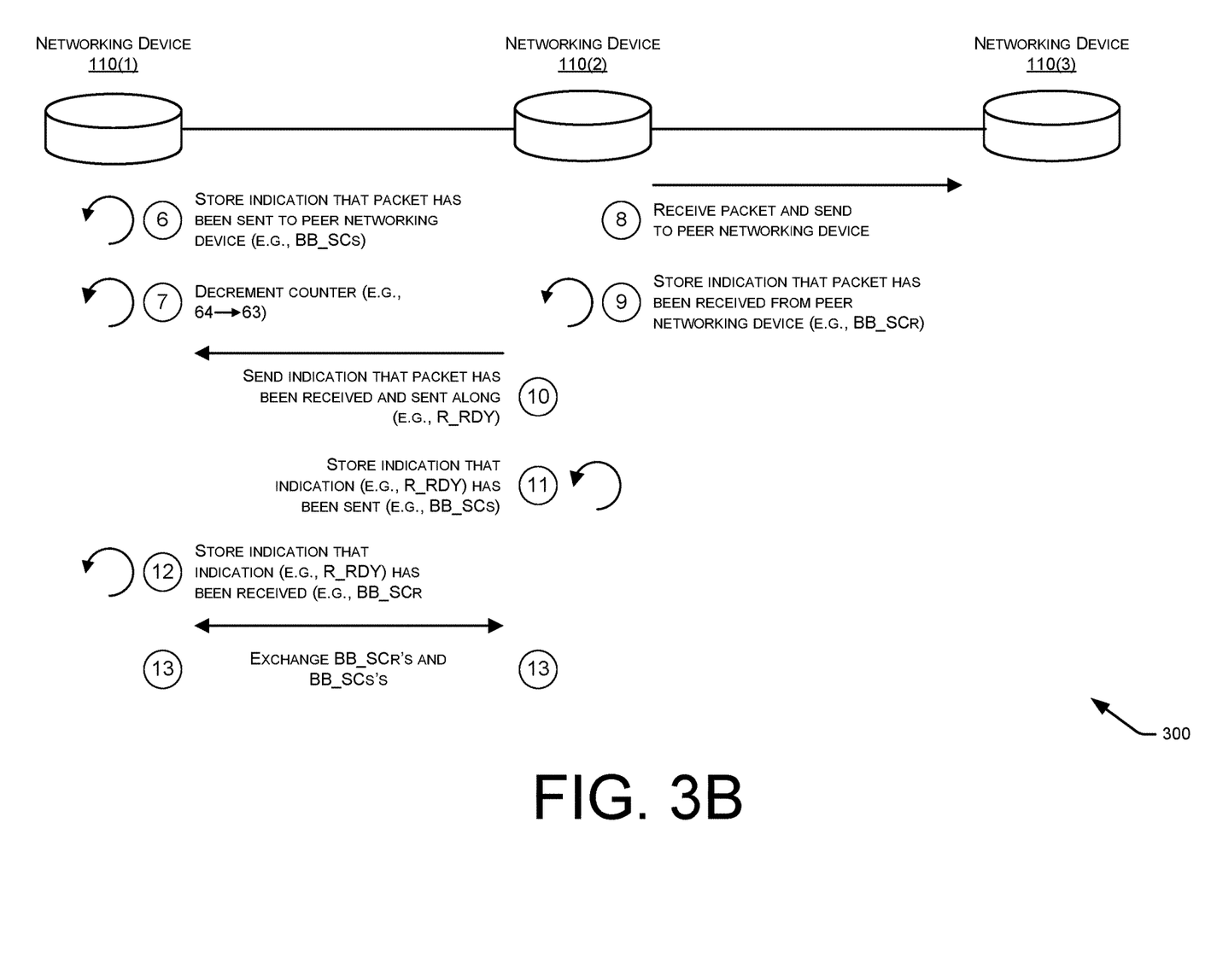
Figure 3C:
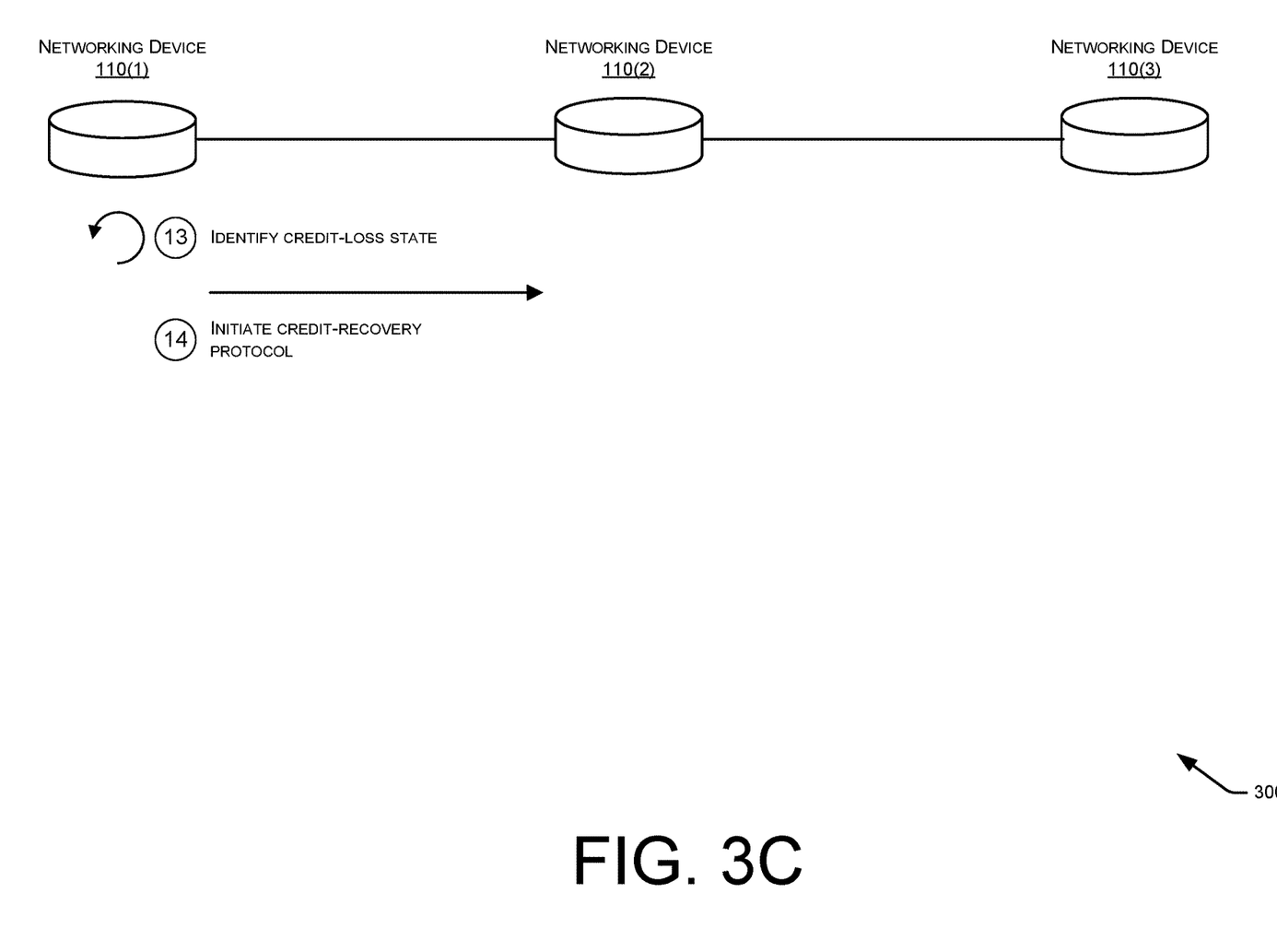

FIGS. 3A-C collectively illustrate an example sequence of operations 300 within the fabric 108 as it pertains to the networking devices 110(1) and 110(2). It is to be appreciated that similar, non-illustrated operations may occur between the second networking device 110(2) and the third networking device 110(3), as well as between other networking devices in the fabric 108.

At "1", the first networking device 110(1) may send one or more training frames to the second networking device 110(2). The training frames may correspond, in whole or in part, to the illustrated control and status training frames 202 and 204. Further, these training frames may be associated with different values of negotiating and enabling a communication channel between the first and second networking devices 110(1) and 110(2). For instance, the training frames may include values for negotiating a speed of the connection, a value for enabling (or not) forward error correction, and a value specifying a request that the second networking device 110(2) enable a protocol, such as the BBSC protocol. For example, the training frame(s) may include a control training frame specifying a request that the second networking device 110(2) has or will enable the BBSC protocol.

At "2", and in response to receiving the training frames at "1", the second networking device 110(2) may send one or more additional training frames to the first networking device 110(1). These training frames may continue to the negotiate the to-be-established connection between the first and second networking devices 110(1) and 110(2). Furthermore, these training frames may indicate that the second networking device 110(2) has enable the BBSC protocol, potentially in addition to indicating that the second networking device 110(2) has enabled FEC.

It is to be appreciated that, in some instances, the networking devices may exchange additional primitives at this point in the sequence of operations for establishing the communication channel between each respective pair of networking devices, such as a fiber channel communication. For example, the sequence of operations may include performing additional link-bring-up activity, such as exchanging fiber-channel primitives between peer networking devices. This activity may configure the physical transmission layer for sending subsequent frames between peer networking devices.

At "3", the second networking device 110(2) may advertise the amount of buffers that the device will use during the communication session. At "4", the first networking device 110(1) determines the amount of buffers used by the second networking device 110(2) and initializes a counter corresponding to this number. At "5", the first networking device receives a data packet from a host (or from an upstream networking device) and sends along the data packet to the second networking device 110(2).

FIG. 3B continues the illustration and includes, at "6", the first networking device 110(1) storing an indication that it sent the data packet to the second networking device 110(2). For example, the first networking device 110(1) may update a count of packets sent to the second networking device 110(2). In some instance, this information may be stored in an instance of a flow-control datastore on the first networking device 110(1). In addition, at "7", the first networking device decrements its counter, given that it has sent a data packet to the second networking device. For example, if the second networking device 110(2) advertised that it was using 64 buffers, then the first networking device 110(1) may decrement the counter from 64 to 63.

At "8", the second networking device 110(2) receives the packet from the first networking device 110(1) and, in response, sends this packet along to the third networking device 110(3). In addition, at "9", the second networking device 110(2) may store an indication that it received a packet from the first networking device 110(1). For example, the second networking device 110(2) may update its count of packets received from the first networking device 110(1), which may be stored in the flow-control datastore 132. It is also noted that the second networking device 110(2) may also store an indication, as part of a different count, that the second networking device 110(2) send a packet to the third networking device 110(3), but that count is pertinent to the illustrated example.

At "10", the second networking device 110(2) may send an indication that it received and sent along a packet. For example, the second networking device 110(2) may send an R_RDY primitive to the first networking device 110(1) in response to sending the packet to the third networking device 110(3). At "11", the second networking device may store an indication that the R_RDY has been sent to the first networking device 110(1). For example, the second networking device 110(2) may update a count of R_RDY primitives sent to the first networking device 110(1), which may be stored in the flow-control datastore.

At "12", the first networking device 110(1) receives the R_RDY primitive and stores an indication of its receipt. For example, the first networking device 110(1) may update a count of R_RDY primitives received from the second networking device 110(2).

At "13", the first and second networking devices 110(1) and 110(2) may exchange flow-control information. For example, the first networking device may send BBSCr data (indicating the number of R_RDY primitives received from the second networking device 110(2) and BBSCs data (indicating the number of data packets sent to the second networking device 110(2)). Meanwhile, the second networking device 110(2) may send BBSCs data (indicating the number of R_RDY primitives send by the second networking device 110(2) and BBSCr data (indicating the number of data packets received at the second networking device 110(2). This data may be used to determine whether or not a credit-loss state exists. That is, if the number of R_RDY primitives received at the second networking device 110(2) is less than the number of data packets sent by the first networking device 110(1), then a credit-loss state may be identified. In response to identifying a credit-loss state, a credit-recovery process may be initiated.

Figure 4:
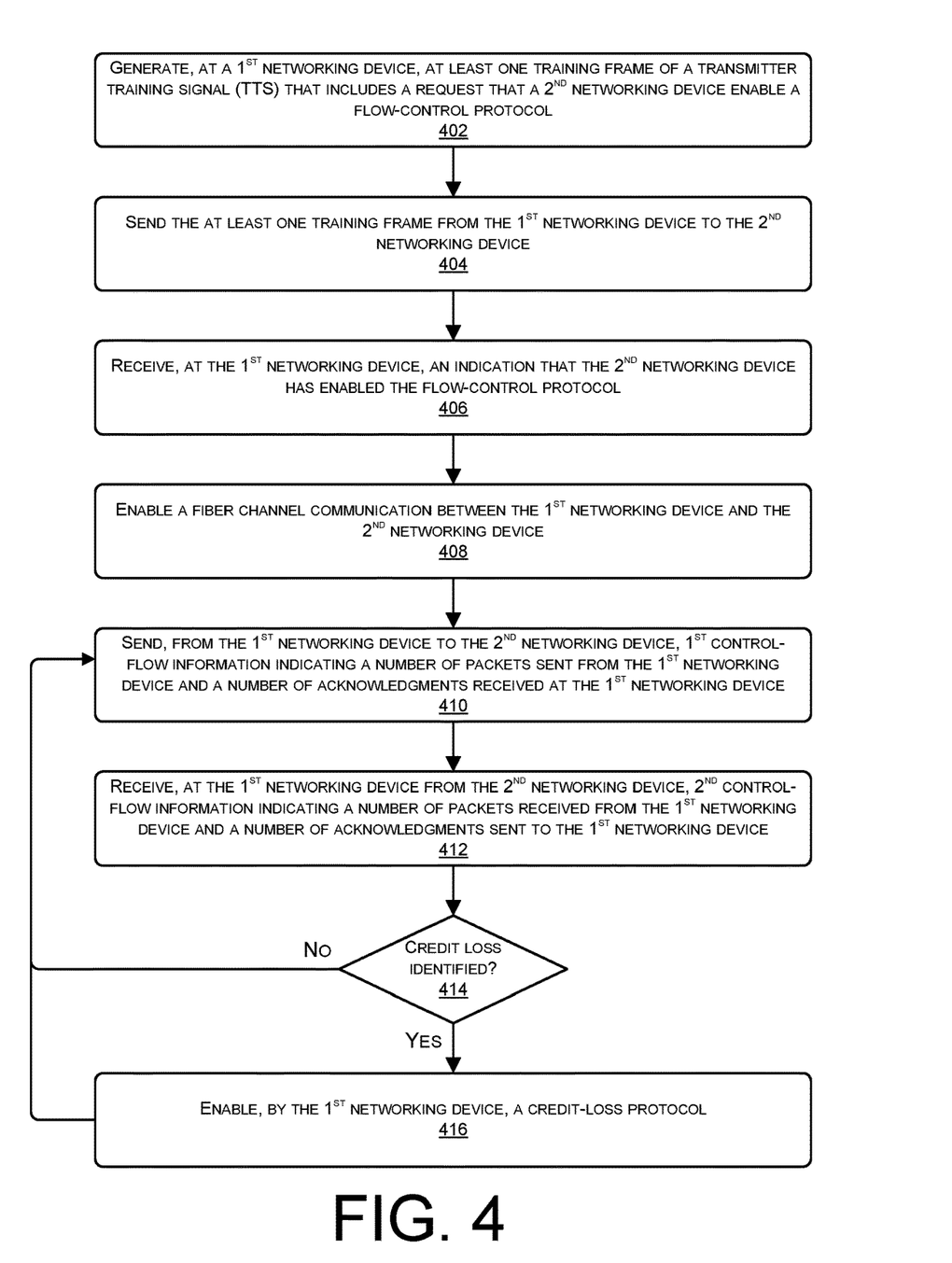
FIG. 4 illustrates a flow diagram of an example process in which a first networking device sends, to a second networking device, one or more training frames that include a request that the second networking device enable a protocol, such as the BBSCN protocol. After the second networking device enables this protocol, the first and second networking devices may exchange flow-control information, as may other peer networking devices in the fabric. This information may be used to identify a credit-loss state, which in turn may result in one or more of the networking switches initializing a credit-recover protocol.

FIG. 4 illustrates a flow diagram of an example process 400 for utilizing the techniques described herein. An operation 402 represents generating, at a first networking device, at least one training frame of a transmitter training signal (TTS) that includes a request for a second networking device to enable a protocol on the second networking device. In some instances, the protocol comprises a buffer-to-buffer state change number (BB_SC_N) protocol. Further, in some instances the at least one training frame may comprise a control training frame comprising the request and a status training frame indicating that the first networking device is capable of implementing the protocol. In addition, the at least one training frame may further include a request for the second networking device to enable forward error correction (FEC) on the second networking device.

An operation 404 represents sending the at least one training from the first networking device to the second networking device. An operation 406 represents receiving, from the second networking device, an indication that the second networking device has enabled the protocol on the second networking device. In some instances, receiving the indication comprises receiving a training frame of the TTS indicating that the second networking device has enabled the protocol on the second networking device.

An operation 408 represents enabling a fiber channel between the first networking device and the second networking device at least partly in response to the sending of the at least one training frame of the TTS from the first networking device to the second networking device.

An operation 410 represents sending, from the first networking device, to the second networking device and using the protocol, first flow-control information indicating a number of data packets sent by the first networking device to the second networking device and a number of acknowledgments received from the second networking device. In some instances, the first flow-control information comprises: (i) a buffer-to-buffer state change send (BB_SCs) primitive indicating the number of data packets sent by the first networking device to the second networking device, and (ii) a buffer-to-buffer state change receive (BBSCr) primitive indicating the number of acknowledgments received from the second networking device.

An operation 412, meanwhile, represents receiving, at the first networking device, from the second networking device and via the protocol, second flow-control information indicating a number of data packets received at the second networking device from the first networking device and a number of acknowledgments sent by the second networking device to the first networking device. In some instances, the second flow-control information comprises: (i) a second BB_SCs primitive indicating the number of data packets received at the second networking device from the first networking device, and (ii) a second BBSCr primitive indicating the number of acknowledgments sent by the second networking device to the first networking device.

An operation 414 represents determining whether credit loss has been identified. For example, this may include comparing the first flow-control information to the second flow-control information to identify credit loss and, thus, to identify a credit-loss state. If a credit-loss state is identified, then an operation 416 represents enabling a credit-recovery protocol at least partly in response to the identifying of the credit-loss state. If no credit loss is identified, or after identifying the credit loss, the process 400 may return to the exchange of subsequent flow-control information at the operation 410.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A-B and 4, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
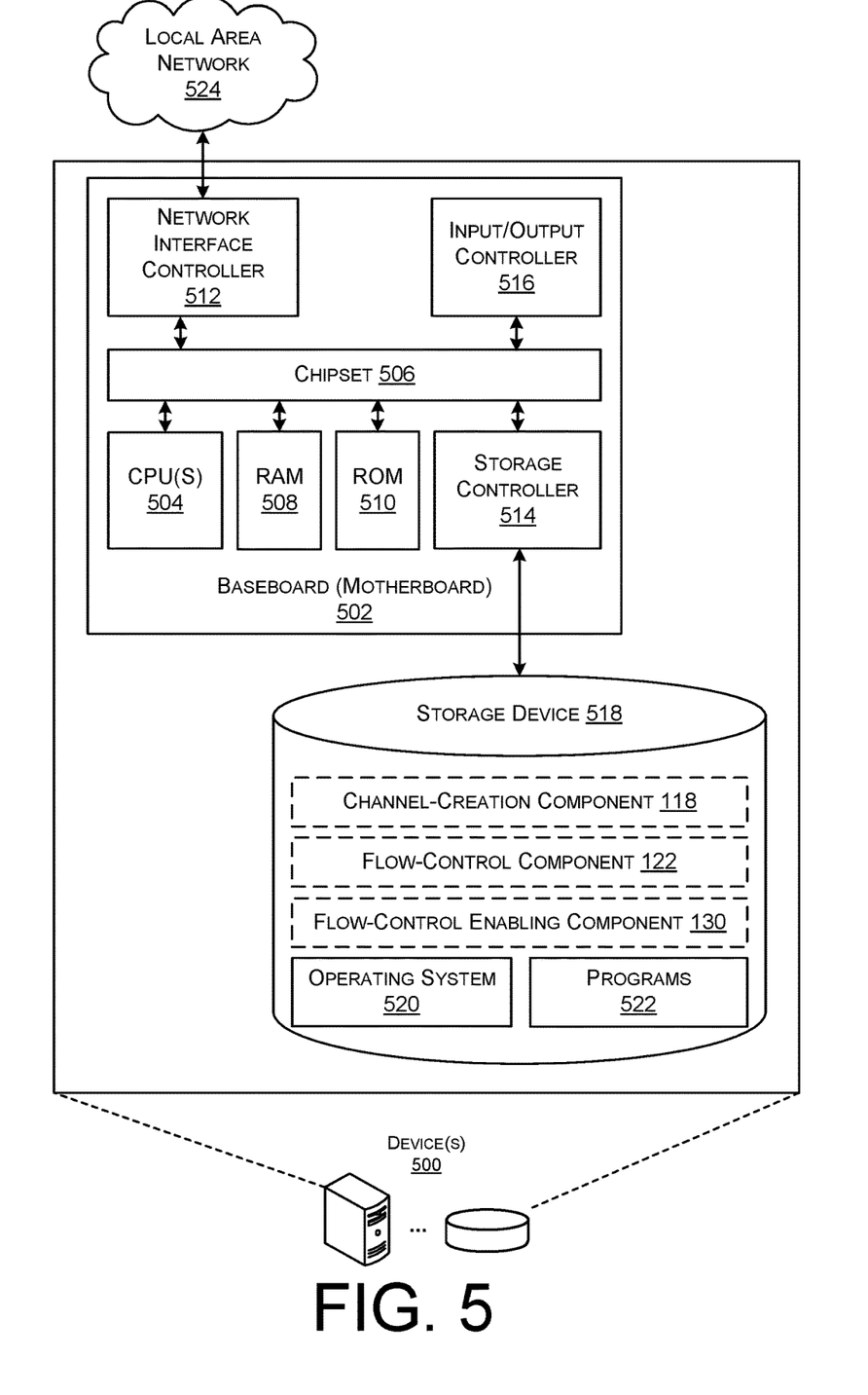
FIG. 5 is a computer architecture diagram showing an illustrative computer hardware architecture for implementing computing devices configured to implement the techniques described herein.

FIG. 5 is a computer architecture diagram showing an illustrative computer hardware architecture for implementing a device 500 that can be utilized to implement aspects of the various technologies presented herein. The source device 102, the target device 106, and/or the networking devices 110, discussed above, may include some or all of the components discussed below with reference to the device 500.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 500 can also be configured to execute a resource manager capable of instantiating and/or managing the computing resources. In the case of VM instances, for example, the resource manager can be a hypervisor or another type of program configured to enable the execution of multiple VM instances on a single server device 500. Devices 500 in a data center can also be configured to provide network services and other types of services.

The device 500 includes a baseboard 502, or "motherboard," which is a printed circuit board to which a multitude of components or devices can be connected by way of a system bus or other electrical communication paths. In one illustrative configuration, one or more central processing units (CPUs) 504 operate in conjunction with a chipset 506. The CPUs 504 can be standard programmable processors that perform arithmetic and logical operations necessary for the operation of the device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the device 500. The chipset 506 can further provide an interface to a computer-readable storage medium such as a read-only memory (ROM) 510 or non-volatile RAM (NVRAM) for storing basic routines that help to startup the device 500 and to transfer information between the various components and devices. The ROM 510 or NVRAM can also store other software components necessary for the operation of the device 500 in accordance with the configurations described herein.

The device 500 can operate in a networked environment using logical connections to remote computing devices and computer systems through a network, such as a local area network 524. The chipset 506 can include functionality for providing network connectivity through a Network Interface Card (NIC) 512, such as a gigabit Ethernet adapter. The NIC 512 is capable of connecting the device 500 to other computing devices over the network. It should be appreciated that multiple NICs 512 can be present in the device 500, connecting the computer to other types of networks and remote computer systems.

The device 500 can be connected to a storage device 518 that provides non-volatile storage for the computer. The storage device 518 can store an operating system 520, programs 522, and data, which have been described in greater detail herein. The storage device 518 can be connected to the device 500 through a storage controller 514 connected to the chipset 506. The storage device 518 can consist of one or more physical storage units. The storage controller 514 can interface with the physical storage units through a serial attached SCSI (SAS) interface, a serial advanced technology attachment (SATA) interface, an FC interface, or other type of interface for physically connecting and transferring data between computers and physical storage units.

The device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 500 can further read information from the storage device 518 by detecting the physical states or characteristics of one or more particular locations within the physical storage units.

In addition to the mass storage device 518 described above, the device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the device 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the device 500.

In one embodiment, the storage device 518 or other computer-readable storage media is encoded with computer-executable instructions which, when loaded into the device 500, transform the computer from a general-purpose computing system into a special-purpose computer capable of implementing the embodiments described herein. These computer-executable instructions transform the device 500 by specifying how the CPUs 504 transition between states, as described above. According to one embodiment, the device 500 has access to computer-readable storage media storing computer-executable instructions which, when executed by the device 500, perform the various processes described above with regard to FIGS. 1-4. The device 500 can also include computer-readable storage media having instructions stored thereupon for performing any of the other computer-implemented operations described herein.

The device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the device 500 might not include all of the components shown in FIG. 5, can include other components that are not explicitly shown in FIG. 5, or might utilize an architecture completely different than that shown in FIG. 5.

The device 500 may also store, in the storage device 518, the channel-creation component 118, the flow-control component 122, the protocol-enabling component 130, and/or additional elements described above with reference to FIGS. 1-4.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A first networking device comprising:
one or more processors; and
one or more computer-readable media storing computer-executable instructions that, when executed, cause the one or more processors to perform acts comprising:
sending, from the first networking device to a second networking device, at least one training frame of a transmitter training signal (TTS) that includes a request for the second networking device to enable a link-level protocol on the second networking device;
receiving, from the second networking device, an indication that the second networking device has enabled the link-level protocol on the second networking device;
sending a number of data packets to the second networking device, wherein the number of data packets are sent at least partly using a Fibre-Channel protocol;
sending, to the second networking device and using the link-level protocol, first flow-control information indicating the number of data packets sent by the first networking device to the second networking device and a number of acknowledgments received from the second networking device; and
receiving, from the second networking device and via the link-level protocol, second flow-control information indicating a number of data packets received at the second networking device from the first networking device and a number of acknowledgments sent by the second networking device to the first networking device.

2. The first networking device as recited in claim 1, wherein:
the link-level protocol comprises a buffer-to-buffer state change number (BB_SC_N) protocol;
the first flow-control information comprises: (i) a buffer-to-buffer state change send (BB_SCs) primitive indicating the number of data packets sent by the first networking device to the second networking device, and (ii) a buffer-to-buffer state change receive (BBSCr) primitive indicating the number of acknowledgments received from the second networking device; and
the second flow-control information comprises: (i) a second BB_SCs primitive indicating the number of data packets received at the second networking device from the first networking device, and (ii) a second BBSCr primitive indicating the number of acknowledgments sent by the second networking device to the first networking device.

3. The first networking device as recited in claim 1, wherein the sending, from the first networking device to the second networking device, the at least one training frame of the TTS comprises sending, from the first networking device to the second networking device, (i) a control frame of the TTS including the request for the second networking device to enable the link-level protocol on the second networking device, and (ii) a status frame of the TTS indicating that the first networking device is capable of implementing the link-level protocol.

4. The first networking device as recited in claim 1, wherein:
the at least one training frame comprises a first training frame; and
the receiving, from the second networking device, the indication that the second networking device has enabled the link-level protocol on the second networking device comprises receiving, from the second networking device, a second training frame of the TTS indicating that the second networking device has enabled the link-level protocol on the second networking device.

5. The first networking device as recited in claim 1, wherein the sending, from the first networking device to the second networking device, the at least one training frame comprises sending, from the first networking device to the second networking device, the at least one training frame that further includes a request for the second networking device to enable forward error correction (FEC) on the second networking device.

6. The first networking device as recited in claim 1, wherein the one or more computer-readable media further stores computer-executable instructions that, when executed, cause the one or more processors to perform an act comprising enabling a fiber channel between the first networking device and the second networking device at least partly in response to the sending of the at least one training frame of the TTS from the first networking device to the second networking device.

7. The first networking device as recited in claim 1, wherein the one or more computer-readable media further stores computer-executable instructions that, when executed, cause the one or more processors to perform acts comprising:
identifying, by the first networking device and using the second flow-control information, a credit-loss state; and
enabling a credit-recovery protocol at least partly in response to the identifying of the credit-loss state.

8. A method comprising:
sending, from a first networking device to a second networking device, at least one training frame of a transmitter training signal (TTS) that includes a request for the second networking device to enable a link-level protocol on the second networking device;
receiving, from the second networking device, an indication that the second networking device has enabled the link-level protocol on the second networking device;
sending a number of data packets to the second networking device, wherein the number of data packets are sent at least partly using a Fibre-Channel protocol;
sending, to the second networking device and using the link-level protocol, first flow-control information indicating the number of data packets sent by the first networking device to the second networking device and a number of acknowledgments received from the second networking device; and
receiving, from the second networking device and via the link-level protocol, second flow-control information indicating a number of data packets received at the second networking device from the first networking device and a number of acknowledgments sent by the second networking device to the first networking device.

9. The method as recited in claim 8, wherein:
the link-level protocol comprises a buffer-to-buffer state change number (BB_SC_N) protocol;
the first flow-control information comprises: (i) a buffer-to-buffer state change send (BB_SCs) primitive indicating the number of data packets sent by the first networking device to the second networking device, and (ii) a buffer-to-buffer state change receive (BBSCr) primitive indicating the number of acknowledgments received from the second networking device; and
the second flow-control information comprises: (i) a second BB_SCs primitive indicating the number of data packets received at the second networking device from the first networking device, and (ii) a second BBSCr primitive indicating the number of acknowledgments sent by the second networking device to the first networking device.

10. The method as recited in claim 8, wherein the sending, from the first networking device to the second networking device, the at least one training frame of the TTS comprises sending, from the first networking device to the second networking device, (i) a control frame of the TTS including the request for the second networking device to enable the link-level protocol on the second networking device, and (ii) a status frame of the TTS indicating that the first networking device is capable of implementing the link-level protocol.

11. The method as recited in claim 8, wherein:
the at least one training frame comprises a first training frame; and
the receiving, from the second networking device, the indication that the second networking device has enabled the link-level protocol on the second networking device comprises receiving, from the second networking device, a second training frame of the TTS indicating that the second networking device has enabled the link-level protocol on the second networking device.

12. The method as recited in claim 8, wherein the sending, from the first networking device to the second networking device, the at least one training frame comprises sending, from the first networking device to the second networking device, the at least one training frame that further includes a request for the second networking device to enable forward error correction (FEC) on the second networking device.

13. The method as recited in claim 8, further comprising enabling a fiber channel between the first networking device and the second networking device at least partly in response to the sending of the at least one training frame of the TTS from the first networking device to the second networking device.

14. The method as recited in claim 8, further comprising:
identifying, by the first networking device and using the second flow-control information, a credit-loss state; and
enabling a credit-recovery protocol at least partly in response to the identifying of the credit-loss state.

15. One or more computer-readable media storing computer-executable instructions that, when executed, cause one or more processors to perform acts comprising:
sending, from a first networking device to a second networking device, at least one training frame of a transmitter training signal (TTS) that includes a request for the second networking device to enable a link-level protocol on the second networking device;
receiving, from the second networking device, an indication that the second networking device has enabled the link-level protocol on the second networking device;
sending a number of data packets to the second networking device, wherein the number of data packets are sent at least partly using a Fibre-Channel protocol;
sending, to the second networking device and using the link-level protocol, first flow-control information indicating the number of data packets sent by the first networking device to the second networking device and a number of acknowledgments received from the second networking device; and
receiving, from the second networking device and via the link-level protocol, second flow-control information indicating a number of data packets received at the second networking device from the first networking device and a number of acknowledgments sent by the second networking device to the first networking device.

16. The one or more computer-readable media as recited in claim 15, wherein:
the link-level protocol comprises a buffer-to-buffer state change number (BB_SC_N) protocol;
the first flow-control information comprises: (i) a buffer-to-buffer state change send (BB_SCs) primitive indicating the number of data packets sent by the first networking device to the second networking device, and (ii) a buffer-to-buffer state change receive (BBSCr) primitive indicating the number of acknowledgments received from the second networking device; and
the second flow-control information comprises: (i) a second BB_SCs primitive indicating the number of data packets received at the second networking device from the first networking device, and (ii) a second BBSCr primitive indicating the number of acknowledgments sent by the second networking device to the first networking device.

17. The one or more computer-readable media as recited in claim 15, wherein the sending, from the first networking device to the second networking device, the at least one training frame of the TTS comprises sending, from the first networking device to the second networking device, (i) a control frame of the TTS including the request for the second networking device to enable the link-level protocol on the second networking device, and (ii) a status frame of the TTS indicating that the first networking device is capable of implementing the link-level protocol.

18. The one or more computer-readable media as recited in claim 15, wherein:
the at least one training frame comprises a first training frame; and
the receiving, from the second networking device, the indication that the second networking device has enabled the link-level protocol on the second networking device comprises receiving, from the second networking device, a second training frame of the TTS indicating that the second networking device has enabled the link-level protocol on the second networking device.

19. The one or more computer-readable media as recited in claim 15, wherein the sending, from the first networking device to the second networking device, the at least one training frame comprises sending, from the first networking device to the second networking device, the at least one training frame that further includes a request for the second networking device to enable forward error correction (FEC) on the second networking device.

20. The one or more computer-readable media as recited in claim 15, wherein the one or more computer-readable media further stores computer-executable instructions that, when executed, cause the one or more processors to perform an act comprising enabling a fiber channel between the first networking device and the second networking device at least partly in response to the sending of the at least one training frame of the TTS from the first networking device to the second networking device.

\* \* \* \* \*